United States Patent
Forrest et al.

(10) Patent No.: US 6,367,271 B2
(45) Date of Patent: Apr. 9, 2002

(54) SPEED COMPENSATED INLET AIR MIXTURE CONTROL METHOD FOR A VEHICLE AIR CONDITIONING SYSTEM

(75) Inventors: Wayne Oliver Forrest, Gasport; Elliott D. Keen, Lockport; Nicholas Joseph Alonge, Jr., Tonawanda, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/922,034

(22) Filed: Aug. 3, 2001

Related U.S. Application Data

(63) Continuation-in-part of application No. 09/546,278, filed on Apr. 10, 2000.

(51) Int. Cl.$^7$ .............................................. F25D 17/04
(52) U.S. Cl. ...................................................... 62/186
(58) Field of Search .......................... 62/186, 177, 132, 62/244; 236/49.3, 91; 165/244, 16, 42; 417/2

(56) References Cited

U.S. PATENT DOCUMENTS

| | | | |
|---|---|---|---|
| 4,265,597 A | 5/1981 | Payne et al. | 417/32 |
| 4,537,035 A | 8/1985 | Stiles | 62/89 |
| 4,759,269 A | 7/1988 | Brown et al. | 454/75 |
| 4,892,135 A | 1/1990 | Sakurada et al. | 165/42 |
| 4,974,664 A | 12/1990 | Glennon et al. | 165/271 |
| 5,127,576 A | 7/1992 | Weatherhead et al. | |
| 5,267,451 A | 12/1993 | Cleveland | 62/186 |
| 5,385,030 A | 1/1995 | Kitaagawa et al. | 62/160 |
| 5,511,724 A | 4/1996 | Freiberger et al. | 236/49.3 |
| 5,619,862 A | 4/1997 | Ruger et al. | 62/409 |
| 5,645,479 A | 7/1997 | Komowski | 454/139 |
| 5,649,429 A | 7/1997 | Schreiber | 62/186 |
| 6,134,895 A | 10/2000 | Poloskey et al. | 62/97 |
| 6,151,903 A | 11/2000 | Hironaka | 62/176.6 |

*Primary Examiner*—Teresa Walberg
*Assistant Examiner*—Daniel Robinson
(74) *Attorney, Agent, or Firm*—Patrick M. Griffin

(57) ABSTRACT

An improved method of operation for a vehicle air conditioning system controls an inlet air blower motor and an air inlet mixing device to reduce compressor and blower motor power consumption and achieve performance improvements associated with cabin air recirculation while maintaining a predefined level of outside air flow and a predetermined humidity level in the inlet air mixture of the system. The overall air flow is determined by the speed of the blower motor and the speed of the vehicle, and the speed of the blower motor and the position of the inlet air mixing device are adjusted as a function of both the vehicle speed and the selected blower motor speed so that the predefined level of outside air flow is preserved regardless of the vehicle speed and the selected blower motor speed.

6 Claims, 4 Drawing Sheets

SPEED COMPENSATED INLET AIR MIXTURE CONTROL METHOD FOR A VEHICLE AIR CONDITIONING SYSTEM

RELATED APPLICATIONS

This is a continuation-in-part of co-pending U.S. patent application Ser. No. 09/546,278 filed Apr. 10, 2000, and assigned to the assignee of this application.

TECHNICAL FIELD

This invention relates to a vehicle air conditioning system, and more particularly to a control for maintaining a predetermined level of outside air in a system capable of mixing outside air with recirculated air and having a controllable air conditioning blower motor.

BACKGROUND OF THE INVENTION

A vehicle air conditioning system performs two primary functions: temperature regulation and dehumidification. After an initial cool-down period where the air inside the vehicle is relatively hot, these functions and the vehicle fuel economy can often be enhanced by drawing at least a portion of the air supplied to the cabin space from the cabin itself instead of from outside the cabin. The introduction of air drawn from the cabin generally reduces the enthalpy and moisture content of the inlet air mixture to be conditioned for redelivery to the cabin. In manually controlled systems operated in a "recirculation" mode, the introduction of outside air is commonly accomplished through the use of a mechanical bleed device designed to maintain a designated proportion of outside air under a specific set of static circumstances (for example, at a given vehicle speed and blower motor setting). In other manually controlled systems and some automatically controlled systems, inlet air mixing is achieved with an inlet air mixing device, such as controlled door in an inlet air duct. In such cases, the inlet air mixture comprising predominantly outside air when the system is operated in an "outside air" mode, and predominantly air drawn from inside the cabin when the system is operated in a "recirculation" or "Max A/C" mode. In the manually controlled versions, the operator selects the desired mode, while in the automatically controlled versions, the selection is performed by a system controller based on various input parameters such as the desired cabin temperature, the measured cabin temperature, and so on. In any event, it is commonly recommended that the usage of cabin air recirculation be limited in order to more effectively purge odors, carbon-dioxide and smoke generated in the cabin, and in order to prevent intrusion of exhaust gases under certain conditions. Additionally, extended operation in the recirculation mode can tend to lower the relative humidity of the cabin air to an uncomfortable level.

At higher vehicle speeds, inlet air mixing and total air flow is also influenced by the flow of air around the vehicle body. Specifically, the air flow creates a positive pressure where ventilation air enters the vehicle and a negative pressure where ventilation air exits the vehicle. This can force a significantly higher amount of outside air through the ventilation system than ordinarily desired by the vehicle occupants.

SUMMARY OF THE INVENTION

The present invention is directed to an improved method for controlling inlet air mixing in a vehicle air conditioning system having an inlet air blower motor and an air inlet mixing device for admitting inlet air from outside and/or inside the vehicle cabin, wherein the blower motor and mixing device are controlled under predefined operating conditions to reduce compressor and blower motor power consumption and achieve performance improvements associated with cabin air recirculation while maintaining a predefined level of outside air flow in the inlet air mixture of the system. The total air delivered to the vehicle cabin is determined by the speed of the cabin air blower motor, the speed of the vehicle, and the position of the inlet air control door. Under high air conditioning load, the control of this invention adjusts the speed of the blower motor and the position of the inlet air mixing device as a function of both the vehicle speed and the selected blower motor speed so that the predefined level of outside air flow is preserved regardless of the vehicle speed and the selected blower motor speed. At low or no air conditioning load, when the position of the inlet air mixing device is set to provide only outside air flow, the control of this invention adjusts the speed of the blower motor to provide the desired air flow based upon the vehicle speed so that a predefined level of outside air is preserved regardless of vehicle speed and the selected blower motor speed.

DESCRIPTION OF THE PREFERRED EMBODIMENT

Figure 1:
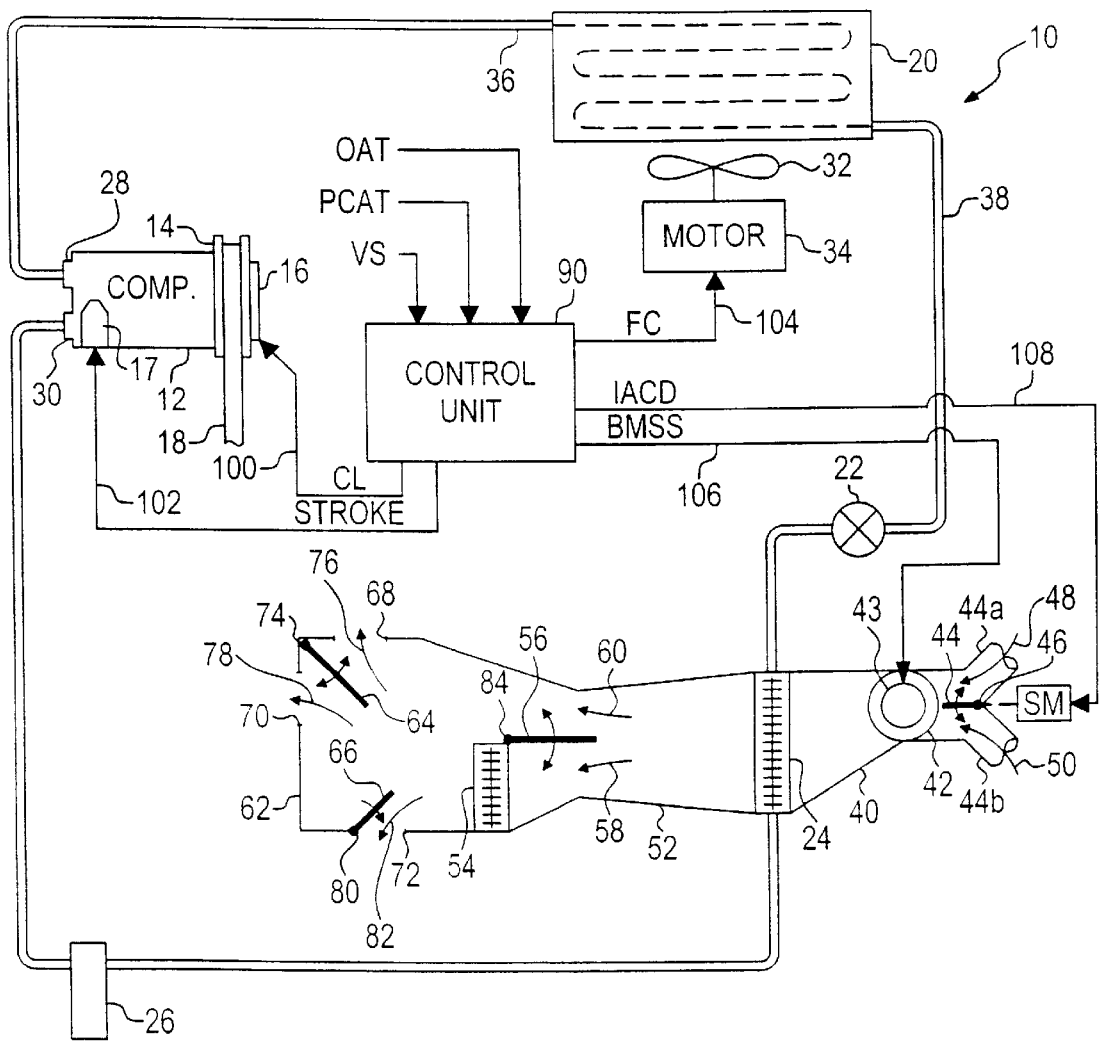
FIG. 1 is a block diagram of a vehicle air conditioning system according to this invention, including a microprocessor-based control unit, an inlet air mixing device and an inlet air blower motor.

Referring to FIG. 1, the reference numeral 10 generally designates a vehicle air conditioning system, including a refrigerant compressor 12 coupled to a drive pulley 14 via an electrically activated clutch 16. In the illustrated embodiment, the compressor 12 has a variable stroke for adjusting its capacity, and includes a stroke control valve 17 that is electrically activated to effect capacity control. The pulley 14 is coupled to a rotary shaft of the vehicle engine (not shown) via drive belt 18, and the clutch 16 is selectively engaged or disengaged to turn the compressor 12 on or off, respectively. The system 10 further includes a condenser 20, an orifice tube 22, an evaporator 24, and an accumulator/dehydrator 26 arranged in order between the compressor discharge port 28 and suction port 30. A cooling fan 32, operated by an electric drive motor 34, is controlled to provide supplemental air flow through the condenser 20 for removing heat from condenser 20. The orifice tube 22 allows the cooled high pressure refrigerant in line 38 to expand in an isenthalpic process before passing through the evaporator 24. The accumulator/dehydrator 26 separates low pressure gaseous and liquid refrigerant, directs a gaseous portion to the compressor suction port 30, and acts as a reservoir for the reserve refrigerant charge. In an alternative system configuration, the orifice tube 22 is replaced with a thermostatic expansion valve (TXV); in this case, the accumulator/ dehydrator 26 is omitted, and a receiver/drier (R/D) is inserted in line 38 upstream of the TXV to ensure that sub-cooled liquid refrigerant is supplied to the inlet of the TXV.

The evaporator 24 is formed as an array of finned refrigerant conducting tubes, and an air intake duct 40 disposed on one side of evaporator 24 houses an inlet air blower 42 driven by an electric blower motor 43 to force air past the evaporator tubes. The duct 40 is bifurcated upstream of the blower 42, and an inlet air control door 44 pivoted at point 46 is adjustable as shown to control inlet air mixing; depending on the door position, outside air may enter blower 42 through duct leg 44a as indicated by arrow 48, and passenger compartment air may enter blower 42 through duct leg 44b as indicated by arrow 50.

An air outlet duct 52 disposed on the downstream side of blower 42 and evaporator 24 houses a heater core 54 formed as an array of finned tubes that conduct engine coolant. The outlet duct 52 is bifurcated with the heater core 54 disposed in one air stream of duct 52. A temperature control door 56 pivoted at a point 84 near the heater core 54 is adjustable as shown to control what proportion of air must pass through the heater core 54. Air passing through heater core 54 is indicated by the arrow 58, while air by-passing the heater core 54 is indicated by the arrow 60. The heated and un-heated air portions are mixed in a plenum portion 62 of outlet duct 52 downstream of temperature control door 56, and a pair of mode control doors 64, 66 direct the mixed air through one or more outlets, including a defrost outlet 68, a panel outlet 70, and a heater outlet 72. The mode control doors 64 and 66, pivoted at points 74 and 80, respectively, are adjustable as shown to switch the outlet air between various combinations of defrost outlet 68, panel outlets 70 and heater outlet 72, as indicated by arrows 76, 78 and 82, respectively.

The system 10 is controlled by the microprocessor-based control unit 90 based on various inputs. In the illustrated embodiment, such inputs include: passenger compartment air temperature PCAT, vehicle speed VS, outside air temperature OAT, and the usual operator demand inputs, such as the desired cabin temperature, and override controls for the speed of inlet air blower motor 43. In an automatically controlled system such as illustrated in FIG. 1, the selected blower motor speed SBMS is obtained from the control unit 90 itself, which either sets SBMS in accordance with a base control or in accordance with an operator override of the base control. In a manually controlled system, SBMS is provided as input to control unit 90 based on the position of an operator manipulated blower motor speed selector switch (not shown).

In response to the above-mentioned inputs, the control unit 90 develops output signals for controlling the compressor clutch 16, the capacity control valve 17, the condenser blower motor 34, the inlet air blower motor 43, and the air control doors 44, 56, 64 and 66. In FIG. 1, the output signal CL for the clutch 16 appears on line 100, the output signal STROKE for the stroke control valve 17 appears on line 102, the output signal FC for the condenser blower motor 34 appears on line 104, and the blower motor speed signal BMSS for the controlling the speed of inlet air blower motor 43 appears on line 106. Finally, the output signal IACD for positioning the inlet air control door 44 appears on line 108, and is applied as an input to an actuator such as stepper motor SM that is mechanically coupled to door 44. For simplicity, output signals and actuators for the air control doors 56, 64, 66 have been omitted from FIG. 1.

According to the present invention, the control unit 90 regulates the speed of inlet air blower motor 43 and the position of inlet air control door 44 based on SBMS and VS so that the inlet air comprises only a predetermined amount of outside air for any combination of SBMS and VS. In the preferred embodiment, the predetermined amount depends on the number of occupants of the vehicle in which the system 10 is installed. A generally accepted guideline is that at least 15 cubic-feet-per-minute (CFM) of outside air should be provided for each of the vehicle occupants. For example, the predetermined amount of outside air may be set to 90 CFM for a six-passenger vehicle. At the lowest blower motor speed (120 CFM, for example), the predetermined amount of outside air represents a relatively high percentage (75%) of the air supplied to the cabin, whereas at the highest blower motor speed (300 CFM, for example), the predetermined amount of outside air represents a relatively low percentage (30%) of the air supplied to the cabin. When the system is operated in the "recirculation" or "Max A/C" modes, the percent of outside air increases as vehicle speed increases. When the system is operated in the "outside air" mode, the total volume of air increases as the vehicle speed increases.

Figure 2:
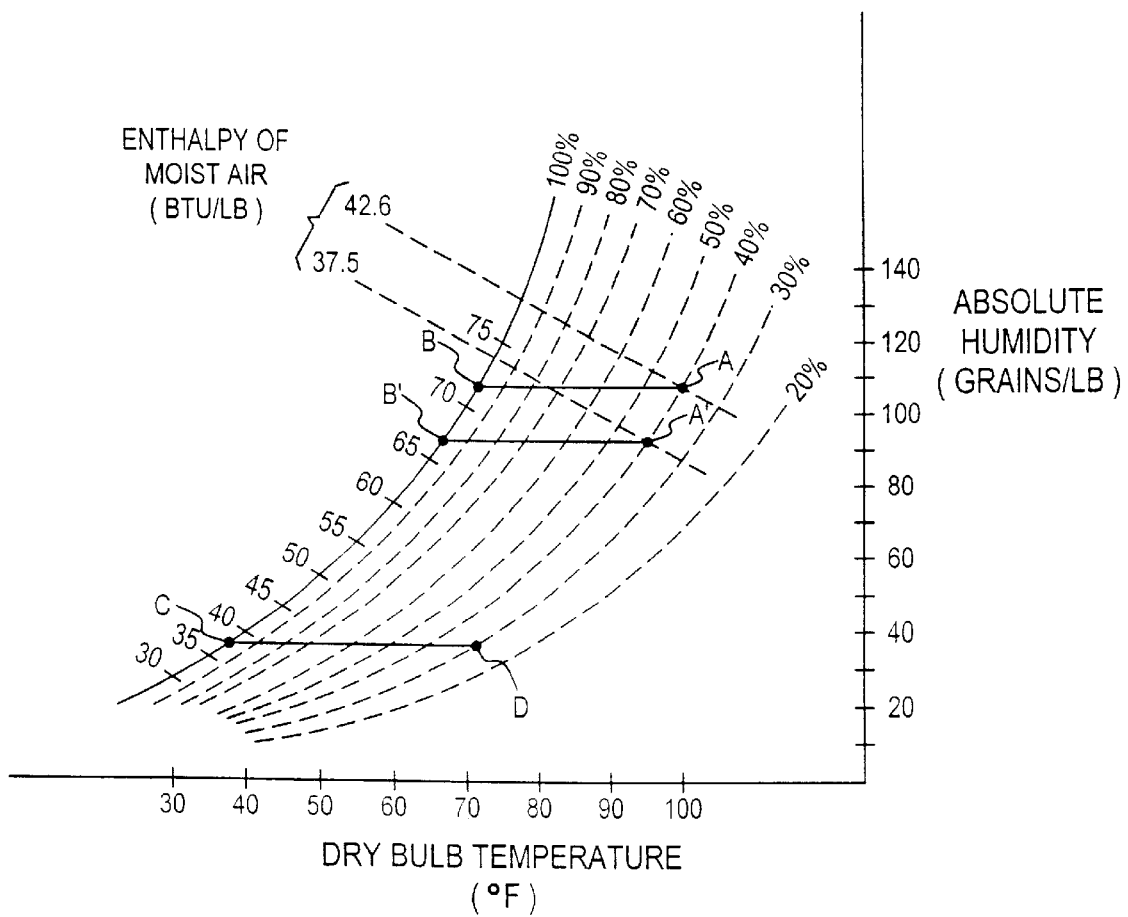
FIG. 2 is a psychrometric chart illustrating different possible operating modes of the air conditioning system of FIG. 1.

The psychrometric chart of FIG. 2 illustrates the significance of the above-described control. The chart depicts the absolute humidity of air as a function of dry bulb temperature, with the curved broken lines representing lines of constant relative humidity, and the straight broken lines representing lines of constant enthalpy. The various data points A, A', B, B', C and D represent the condition of air outside the vehicle, at various points in the ducts 40, 52, and in the passenger compartment. The point A represents a traditional system at a low blower, stabilized condition, with a dry bulb outside air temperature of 100° F., at 40% relative humidity. As the air passes through the evaporator 24, its dry bulb temperature decreases with no change in absolute humidity until the relative humidity rises to 100%, as depicted by the line segment A–B. As the air is further cooled, water vapor condenses on the surface of evaporator 24, with the relative humidity remaining at 100%. Under a given set of conditions, the control unit 90 regulates the compressor stroke to control the dew point temperature of evaporator 24 to approximately 38° F., so that air at the evaporator outlet is represented by the point C. Then, the air is re-heated by the heater core 54 so that the air temperature in the passenger compartment has a dry bulb temperature of 72° F., as represented by the point D. As the air is re-heated, its absolute humidity remains the same, but its relative humidity drops, as indicated by the line segment C–D, providing a cabin relative humidity of approximately 30%.

In accordance with the present invention, a similar cabin temperature and relative humidity level is achieved, but with reduced energy consumption, by adjusting the blower motor speed and the position of inlet air control door 44 as a function of SBMS and VS, as described above. In this illustration, the outside air constitutes approximately 70% of the inlet air mixture, and is represented by the point A'. Significantly, the enthalpy, temperature, dew point and absolute humidity of the inlet air mixture are all decreased due to the influence of the cabin air; as a result, the net work performed by the compressor 12 to drop the temperature and humidity to the level designated by the point C is substantially reduced, as indicated by the difference in enthalpy between point A (42.6 BTU/LB) and point A' (37.5 BTU/LB). When the cooling capacity of the system 10 is limited (due to low compressor speed, for example), the passenger comfort is also improved because the inlet air mixture can be cooled and de-humidified to lower levels than outside air alone.

Figure 3:
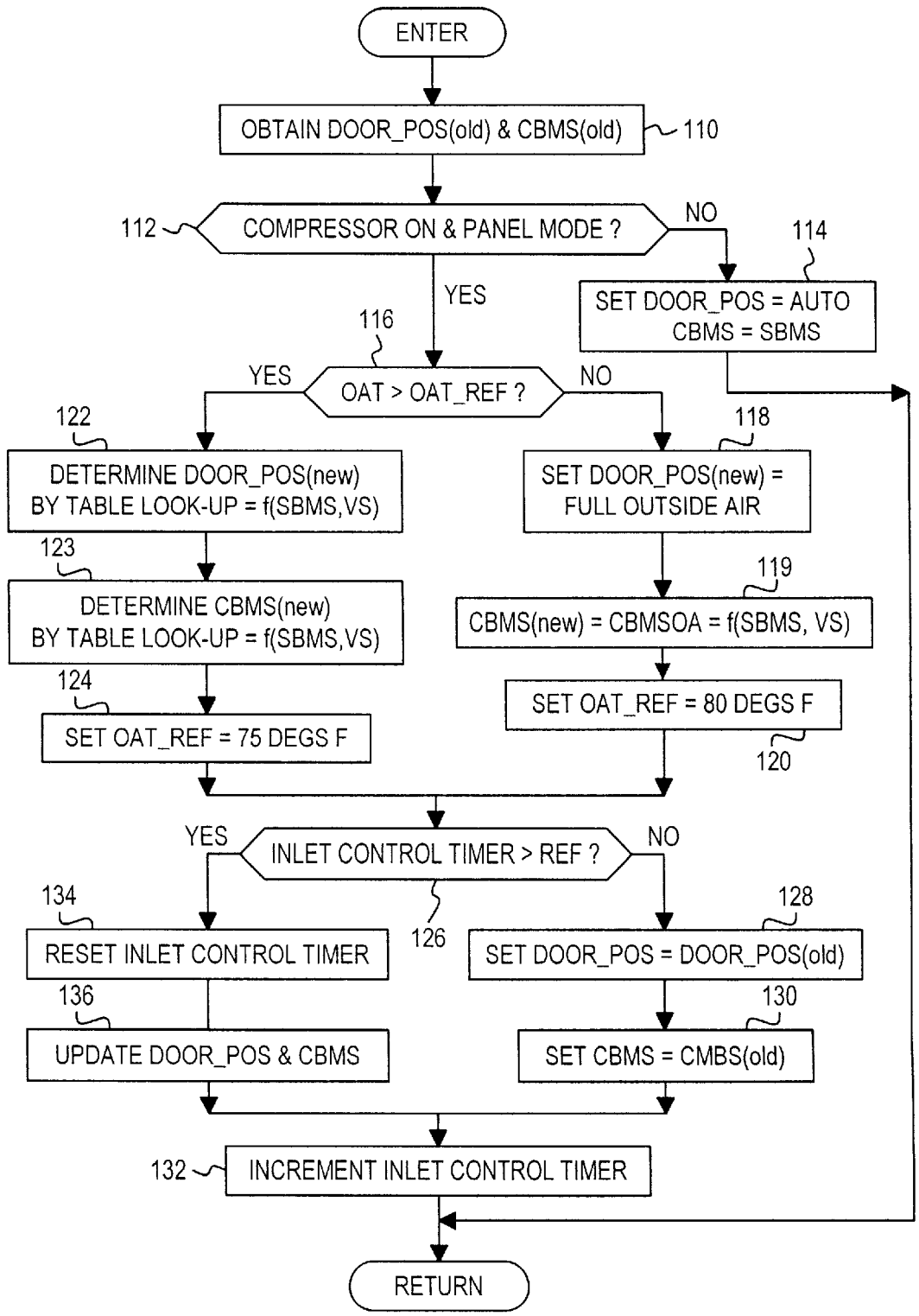
FIG. 3 is a flowchart illustrating a software routine executed by the microprocessor-based control unit of FIG. 1 in carrying out the control of this invention.

FIG. 3 depicts a flow diagram representative of computer program instructions executed by the control unit 90 for determining appropriate control settings DOOR_POS and CBMS for the inlet air control door 44 and the inlet air blower motor 43. The parameter DOOR_POS is used to schedule the output IACD on line 108, and the parameter CBMS is used to schedule the output BMSS on line 106. The block 110 is first executed to obtain the previous position command DOOR_POS(old) for the inlet air control door 44 and the previous speed command CBMS(old) for blower motor 43. The block 112 then determines if the compressor 12 is running (that is, whether clutch 16 is engaged) and the system 10 is operating in a panel discharge mode, as opposed to a defrost mode, for example. If not, the control of this invention is not enabled, and the block 114 is executed to set DOOR_POS to AUTO (a position dictated by an automatic climate control algorithm carried out by control unit 90), and to set CBMS equal to the selected blower motor speed SBMS.

If block 112 is answered in the affirmative, the block 116 is executed to determine if the air conditioning load is high. The outside air temperature OAT is measured for control purposes, and the air conditioning load is determined by comparing OAT to a reference temperature OAT_REF. In other systems, an equivalent indication of high load may be obtained based on another load-indicative parameter, such as incoming air enthalpy, condenser outlet pressure or temperature, or compressor outlet pressure or temperature. In the illustrated embodiment, the reference OAT_REF is initialized at a relatively high value, such as 80 degrees F., and if OAT exceeds this value (indicating high air conditioning load), the blocks 122, 123 and 124 are executed to select new or target values DOOR_POS(new) and CBMS (new) for inlet air door 44 and inlet air blower motor 43, and to set OAT_REF to a lower value, such as 75 degrees F. If the load is subsequently reduced, and OAT falls to the lower value, the blocks 118, 119 and 120 are executed to set DOOR_POS(new) to fall outside air, to set CBMS(new) to the commanded blower motor speed in outside air mode CBMSOA, and to restore OAT_REF to the high value (80 degrees F.). As indicated at block 119, CBMSOA may be determined by table look-up as a function of the selected blower motor speed SBMS and the vehicle speed VS.

As indicated at blocks 122–123, DOOR_POS(new) and CBMS(new) under high air conditioning load are determined by table look-up as a function of the selected blower motor speed SBMS and the vehicle speed VS. The table values may be determined empirically based on measured air flow through the ducts 44a, 44b under various combinations of SBMS and VS, so that the values of DOOR_POS(new) and CBMS(new) obtained from the look-up tables will result in an inlet air mixture comprising a predetermined amount (flow) of outside air, as explained above.

Once DOOR_POS(new) and CBMS(new) have been determined, the blocks 126, 128, 130, 132, 134, 136 are executed to carry out required changes in inlet air door position and blower motor speed at a controlled rate. The block 126 determines if the count of an INLET CONTROL TIMER exceeds a reference count REF. If not, blocks 128, 130 and 132 are executed to retain the current door position and blower motor speeds (i.e., DOOR_POS is set equal to DOOR_POS(old), and CBMS is set equal to CBMS(old)), and to increment the INLET CONTROL TIMER. Once the count of the INLET CONTROL TIMER exceeds REF, the block 134 resets the INLET CONTROL TIMER to zero, the block 136 updates DOOR_POS and CBMS, and the block 132 increments the INLET CONTROL TIMER. Thus, the INLET CONTROL TIMER limits the updating of the inlet air door position and inlet air blower motor speed during inlet air mixture control to a desired maximum rate, such as one unit of adjustment per second.

Figure 4:
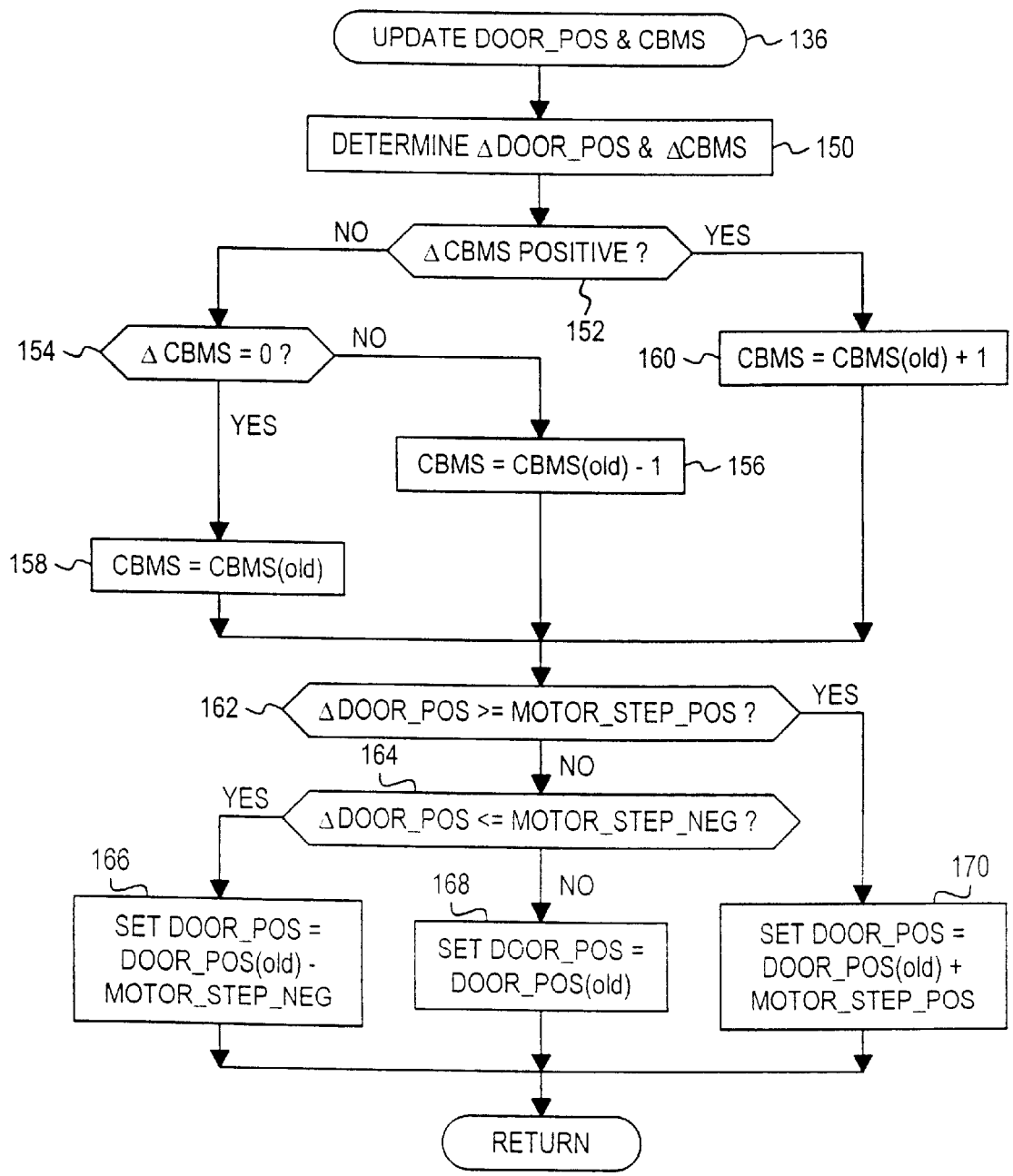
FIG. 4 is a flowchart detailing a portion of the flowchart of FIG. 3 that updates control signals for the inlet air mixing device and the inlet air blower motor of FIG. 1.

FIG. 4 illustrates block 136 of FIG. 3 in further detail. Referring to FIG. 4, the block 150 determines the required changes in blower motor speed and inlet air door position, the blocks 152, 154, 156, 158, 160 update CBMS, and the blocks 162, 164, 166, 168, 170 update DOOR_POS. The required change ΔCBMS in blower motor speed is determined according to the difference [CBMS(new)−CBMS(old)], and the required change ΔDOOR_POS in inlet air door position is determined according to the difference [DOOR_POS(new)−DOOR_POS(old)]. In the illustrated embodiment, both the blower motor 43 and the inlet air door 44 are controlled in step-wise fashion. In the case of blower motor 43, for example, there are a predetermined number of speed settings (sixteen, for example), each associated with a corresponding blower motor speed signal BMSS. If block 152 determines that ΔCBMS is positive, the block 160 increments the speed setting by setting CBMS equal to the sum (CBMS(old)+1). If ΔCBMS is negative, blocks 152 and 154 will be answered in the negative, and the block 156 decrements the speed setting by setting CBMS equal to (CBMS(old)−1). If ΔCBMS=0, the block 158 retains the current speed setting by setting CMBS equal to CBMS(old). Similarly, if block 162 determines that ΔDOOR_POS is positive by an amount at least as great as an actuator step in that direction MOTOR_STEP_POS, the block 170 sets DOOR_POS equal to the sum [DOOR_POS(old)+ MOTOR_STEP_POS]. On the other hand, if ΔDOOR_POS is negative by an amount at least as great as an actuator step in that direction MOTOR_STEP_NEG, as determined at block 164, the block 166 sets DOOR_POS equal to [DOOR_POS(old)−MOTOR_STEP_NEG]. If ΔDOOR_POS is less than the minimum step size of actuator SM, block 168 is executed to retain the current door position by setting DOOR_POS equal to DOOR_POS(old).

Thus, the control unit 90 gradually adjusts the speed of blower motor 43 and the position of inlet air control door 44 under conditions of high or low air conditioning load to increase the amount of recirculated cabin air in the inlet air mixture, while retaining a predetermined amount of outside air regardless of the selected blower motor speed and the vehicle speed, thereby improving both the efficiency and performance of the air conditioning system 10. While described in reference to the illustrated embodiment, it is expected that various modifications in addition to those mentioned above will occur to those skilled in the art. For example, the control of this invention may be applied to air conditioning systems having a fixed displacement compressor, other expansion devices, or utilizing a different capacity control methodology. Also, blower motor voltage, power or current, or an anemometer, could be used instead of blower motor speed as an indicator of the desired air flow rate, and the control could also be compensated for the mode and temperature door positions. Thus, it will be understood that methods incorporating these and other modifications may fall within the scope of this invention, which is defined by the appended claims.

What is claimed is:

1. A method of operation for an air conditioning system of a motor vehicle including an inlet air mixing device for admitting inlet air from outside and/or inside a cabin of the vehicle, and an inlet air blower driven by an electric blower motor to adjust a flow magnitude of the inlet air, the method comprising the steps of:

determining a normally desired speed of the electric blower motor;

determining a forward speed of the vehicle;

determining an override operating state of the inlet air mixing device based on the normally desired speed of the blower motor and the determined vehicle speed for proportioning the admitted inlet air between air from outside and inside the vehicle cabin such that air from outside the vehicle cabin constitutes a predetermined amount of the admitted inlet air; and controlling the inlet air mixing device in accordance with the override operating state.

2. The method of operation of claim 1, including the steps of:

determining an override operating state of the inlet air mixing device and an override speed of the electric blower motor based on the normally desired speed of the blower motor and the determined vehicle speed for proportioning the admitted inlet air between air from outside and inside the vehicle cabin such that air from outside the vehicle cabin constitutes a predetermined amount of the admitted inlet air; and controlling the inlet air mixing device in accordance with the override operating state, and controlling the electric blower motor in accordance with the override speed.

3. The method of operation of claim 2, wherein the step of controlling the electric blower motor includes the steps of:

adjusting an actual speed of the blower motor in a direction to bring such actual speed into correspondence with the override speed; and limiting a rate of adjustment of the actual speed to a predetermined rate.

4. The method of operation of claim 2, including the steps of:

detecting a condition of high air conditioning load;

controlling the inlet air mixing device in accordance with the override operating state when the condition of high air conditioning load is detected; and controlling the inlet air mixing device to a full outside air setting when the condition of high air conditioning load is not detected.

5. The method of operation of claim 4, wherein the condition of high air conditioning load is detected when a temperature of ambient air outside the vehicle cabin is higher than a threshold temperature.

6. The method of operation of claim 2, including the steps of:

detecting a condition of low air conditioning load;

determining a low-load override speed of the electric blower motor based on the normally desired speed of the blower motor and the determined vehicle speed such that air from outside the vehicle cabin constitutes a predetermined amount of the admitted inlet air when the inlet air mixing device is set to a full outside air setting; and when the condition of low air conditioning load is detected:

controlling the inlet air mixing device to said full outside air setting; and controlling the electric blower motor in accordance with said low-load override speed.

* * * * *